US008384252B2

(12) United States Patent
Kakihara et al.

(10) Patent No.: US 8,384,252 B2
(45) Date of Patent: Feb. 26, 2013

(54) LINEAR MOTOR

(75) Inventors: Masanobu Kakihara, Kitakyushu (JP);
Toru Shikayama, Kitakyushu (JP)

(73) Assignee: Kabushiki Kaisha Yaskawa Denki,
Kitakyushu-Shi (JP)

( * ) Notice: Subject to any disclaimer, the term of this patent is extended or adjusted under 35 U.S.C. 154(b) by 97 days.

(21) Appl. No.: 13/036,009

(22) Filed: Feb. 28, 2011

(65) Prior Publication Data
US 2011/0221284 A1 Sep. 15, 2011

(30) Foreign Application Priority Data

Mar. 11, 2010 (JP) .................................. 2010-054384

(51) Int. Cl.
*H02K 41/03* (2006.01)
(52) U.S. Cl. .................. 310/12.24; 310/12.26
(58) Field of Classification Search ............... 310/12.24, 310/12.26
See application file for complete search history.

(56) References Cited

U.S. PATENT DOCUMENTS

| | | | | |
|---|---|---|---|---|
| 5,910,691 A * | 6/1999 | Wavre | ......................... | 310/12.18 |
| 6,713,899 B1 * | 3/2004 | Greubel et al. | ............ | 310/12.18 |
| 6,831,379 B2 | 12/2004 | Ohto et al. | | |
| 6,949,846 B2 * | 9/2005 | Sugita et al. | ................ | 310/12.15 |
| 7,224,089 B2 * | 5/2007 | Morel | ......................... | 310/12.01 |

FOREIGN PATENT DOCUMENTS

| | | |
|---|---|---|
| JP | 7-53427 Y2 | 5/1992 |
| JP | 4103066 B2 | 10/2001 |
| JP | 2005-102487 | 4/2005 |
| JP | 2005-223997 | 8/2005 |
| JP | 4103066 B2 | 6/2008 |
| WO | WO 2008/015151 | 2/2008 |
| WO | WO 2008/079144 | 7/2008 |

OTHER PUBLICATIONS

Japanese Office Action for corresponding JP Application No. 2010-054384, May 9, 2012.
Japanese Office Action for corresponding JP Application No. 2010-054384, Feb. 24, 2012.

* cited by examiner

*Primary Examiner* — Dang Le
(74) *Attorney, Agent, or Firm* — Ditthavong Mori & Steiner, P.C.

(57) ABSTRACT

The disclosure discloses a linear motor comprising: a field system in which a plurality of permanent magnets are linearly arranged: and an armature configured to face said field system and to have an armature core provided with armature windings, said linear motor running along a predetermined direction of travel with either said field system or said armature serving as a mover and the other serving as a stator, wherein: said armature core comprises: auxiliary teeth that are respectively provided on both ends along said direction of travel and around which said armature windings are not wound; and a plurality of main teeth that are provided between said auxiliary teeth, and each of said auxiliary teeth comprises an end portion shape in which a dimension in a teeth height direction orthogonal to said direction of travel is variable along said direction of travel.

5 Claims, 7 Drawing Sheets

LINEAR MOTOR

CROSS-REFERENCE TO RELATED APPLICATION

The present application claims priority from Japanese Patent Application No. 2010-054384, which was filed on Mar. 11, 2010, the disclosure of which is incorporated herein by reference in its entirety.

BACKGROUND OF THE INVENTION

1. Field of the Invention

The present invention relates to a linear motor used, for example, with industrial machine tools, semiconductor packaging equipment, and the like.

2. Description of the Related Art

A linear motor of one prior art has a stator and a mover. In the stator, permanent magnets are arranged with a predetermined pitch (pole-to-pole distance) Pm between adjacent magnets.

With the above configuration, the linear motor introduces a predetermined current corresponding to the position of the armature of the mover to the armature winding, resulting in an electromagnetic effect between the armature windings and the permanent magnets of the stator that causes the mover to move linearly along the direction of travel. While at this time magnetic imbalance then occurs at both ends of the armature core, producing a cogging thrust, the prior art offsets this cogging thrust using the auxiliary teeth by establishing a separation distance Dt between the auxiliary teeth at both end portions (a distance between the center positions in the travel direction of the auxiliary teeth) that satisfies the following equation:

$$Dt=(2n-1)Pm/2 \text{ (where } n \text{ is a natural number)}$$

In addition, note that the cogging thrust includes a plurality of components, such as a primary component and a secondary component, there are known techniques of another prior art that work to decrease both the primary component and the secondary component with the objective of further decreasing the cogging thrust.

The primary component of the cogging thrust is a cogging component in which one wavelength included in the cogging thrust waveform is equivalent to the above pitch Pm, and the secondary component is a cogging component in which two wavelengths are equivalent to the above pitch Pm. In this prior art, the separation distance Dt between the auxiliary teeth is set within the range below, and the height Ht of the auxiliary teeth (the dimension in the direction orthogonal to the direction of travel) is set within an appropriate range less than or equal to the height Ho of the main teeth.

$$(2n-1)Pm/8 \leq Dt \leq (2n-1)Pm/2$$

With this arrangement, a decrease in both the primary component and the secondary component of the cogging thrust is achieved.

SUMMARY OF THE INVENTION

According to the first aspect of the present invention, there is provided a linear motor comprising: a field system in which a plurality of permanent magnets are linearly arranged on a field yoke so that the polarities thereof are alternated: and an armature configured to face the field system with a magnetic air gap therebetween and to have an armature core provided with armature windings, the linear motor running along a predetermined direction of travel with either the field system or the armature serving as a mover and the other serving as a stator, wherein: the armature core comprises: auxiliary teeth that are respectively provided on both ends along the direction of travel and around which the armature windings are not wound; and a plurality of main teeth that are provided between the auxiliary teeth of the both ends and around which the armature windings are respectively wound, and each of the auxiliary teeth comprises an end portion shape in which a dimension in a teeth height direction orthogonal to the direction of travel is variable along the direction of travel.

In the aspect of the present invention, a plurality of permanent magnets is linearly arranged on a field yoke so that the polarities thereof are alternated, thereby constituting a field system. The armature is disposed facing the field system with a magnetic air gap therebetween, and the armature winding is wound around the main teeth provided in the armature core. Then, a predetermined current corresponding to the position of the armature is introduced to the armature winding, causing an electromagnetic effect to occur between the armature winding and permanent magnets and, in turn, a mover (one of the armature or field system) to travel in a predetermined direction of travel with respect to the stator (the other of the armature and field system).

At this time, magnetic imbalance (an end effect) occurs at both ends of the armature core, causing a cogging thrust. According to the aspect of the present invention, auxiliary teeth are provided at both end portions along the direction of travel of the armature core. With this arrangement, the separation distance along the direction of travel between the auxiliary teeth of both end portions and the dimension in the height direction of the auxiliary teeth are suitably set, thereby decreasing the cogging thrust.

The cogging thrust, however, includes a plurality of components. These components include, for example, a primary component in which one wavelength is equivalent to one pole-to-pole distance (the pitch at which the permanent magnets are disposed), and a secondary component in which two wavelengths are equivalent to one pole-to-pole distance. The preferred separation distance between the auxiliary teeth and the preferred dimension of the teeth in the height direction for decreasing the plurality components differ for each component.

Here, the aspect of the present invention forms the auxiliary teeth so that the ends thereof are stepped or curved in shape, thereby changing the dimension of the teeth in the height direction along the direction of travel. With this arrangement, for example, the auxiliary teeth of both end portions are designed with a preferred teeth height dimension for decreasing the primary component in the area in which the preferred separation distance for decreasing the primary component is imparted, and with a preferred teeth height dimension for decreasing the secondary component in the area in which the preferred separation distance for decreasing the secondary component is imparted. Thus, for each of the plurality of components included in the cogging thrust, it is possible to design the auxiliary teeth in the region to be imparted with the separation distance preferred for decreasing the component with a preferred teeth height dimension for decreasing that component. As a result, the plurality of components included in the cogging thrust can be simultaneously and reliably decreased. This then makes it possible to achieve highly accurate drive control and positioning control. Further, since it is thus possible to simultaneously decrease the plurality of components of the cogging thrust, the aspect of the present invention also has the effect of increasing the degree of freedom of design in terms of cogging thrust minimization.

According to the second aspect of the present invention, there is provided a linear motor comprising: a field system in which a plurality of permanent magnets is linearly arranged on a field yoke so that the polarities thereof are alternated: and an armature configured to face the field system with a magnetic air gap therebetween and to have an armature core provided with armature windings, the linear motor running along a predetermined direction of travel with either the field system or the armature serving as a mover and the other serving as a stator, wherein: the armature core comprises: auxiliary teeth that are respectively provided on both ends along the direction of travel and around which the armature windings are not wound; a plurality of main teeth that are provided between the auxiliary teeth of the both ends and around which the armature windings are respectively wound; and shape varying means configured to vary along the direction of travel a dimension of each of the auxiliary teeth in a teeth height direction orthogonal to the direction of travel.

DETAILED DESCRIPTION OF THE EMBODIMENTS

The following describes embodiments of the aspect of the present invention with reference to accompanying drawings.

Figure 1:
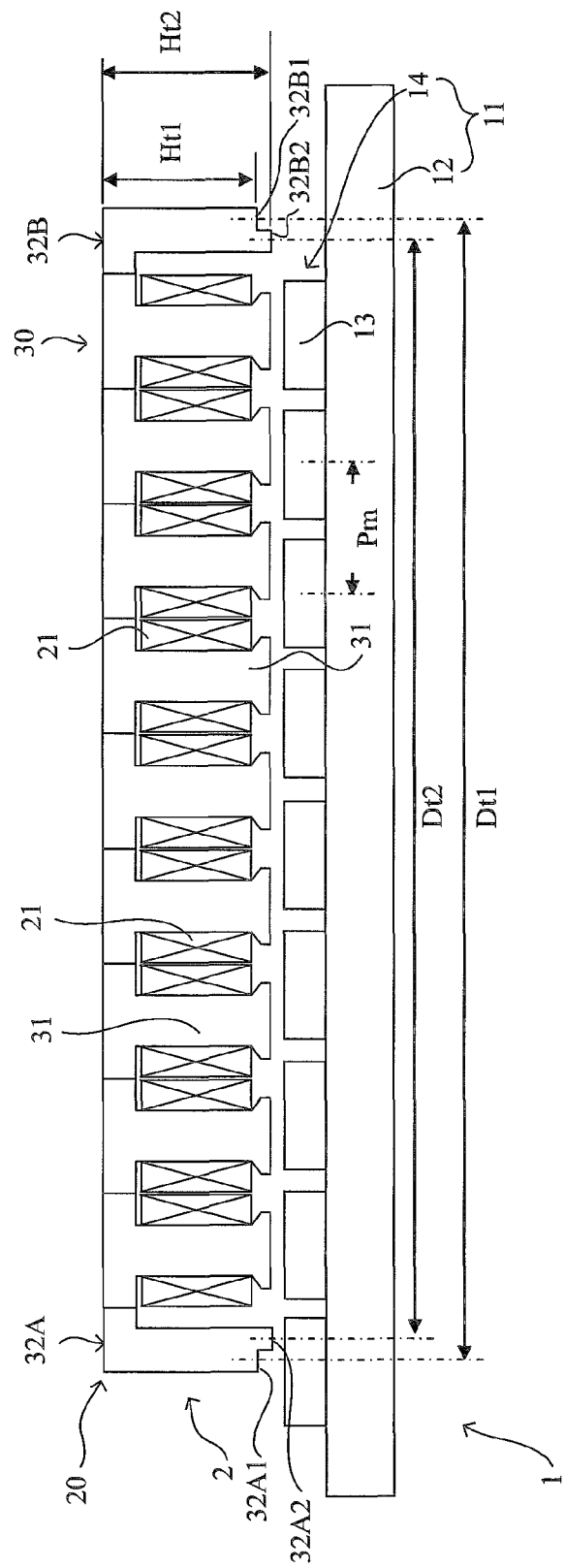
FIG. 1 is a longitudinal sectional view illustrating the structure of a linear motor according to an embodiment.

FIG. 1 is a longitudinal sectional view illustrating the structure of a linear motor according to the embodiment. In FIG. 1, a linear motor 1 of the embodiment comprises a stator 11 and a mover 2 as described above.

The stator 11 consists of a field system comprising a single field yoke 12 and a magnet series 14 made of a plurality of permanent magnets 13. The series of magnets 14 is linearly arranged on the inside of the field yoke 12 along the direction of travel of the mover 2 with the polarities of the plurality of permanent magnets 13 arranged in an alternating manner. The permanent magnets 13 are also arranged with a predetermined pitch (pole-to-pole distance) Pm between adjacent magnets.

The mover 2 comprises an armature 20 disposed facing the field system comprising the field yoke 12 and the magnet series 14 with a magnetic air gap therebetween. The armature 20 comprises an armature core 30 provided with an armature windings 21. The armature core 30 comprises a plurality of main teeth 31 (nine in this example) provided along the direction of travel described above and around which the armature windings 21 is wound, and two auxiliary teeth 32A, 32B provided on the respective end portions thereof along the direction of travel (in other words, on both sides of the nine main teeth 31) and around which the armature winding is not wound.

The auxiliary teeth 32A and 32B have end portions that are stepped in shape. That is, the auxiliary tooth 32A comprises a first step 32A1 having a dimension in the direction orthogonal to the direction of travel, that is, a height Ht1, and a second step 32A2 having a height Ht2, which is longer than Ht1. Similarly, the auxiliary tooth 32B also comprises a first step 32B1 having the height Ht1, and a second step 32B2 having the height Ht2. In addition, the separation distance between the first step 32A1 of the auxiliary tooth 32A and the first step 32B1 of the auxiliary tooth 32B is Dt1, and the separation distance between the second step 32A2 of the auxiliary tooth 32A and the second step 32B2 of the auxiliary tooth 32B is Dt2 (which is smaller than DU). With such a stepped structure, the auxiliary teeth 32A and 32B each exhibit an end portion shape in which the height changes from Ht1 to Ht2 along the direction of travel. Namely, in the embodiment, the shape varying means recited in the claims consist of the stepped structure.

The applicants have discovered through investigations that the optimum values for the separation distance Dt and the height Ht for reliably decreasing the components exist individually for the plurality of components, such as the primary component and secondary component, included in the cogging thrust.

Next, the principle of reducing the cogging thrust by the end portion shape of the auxiliary teeth 32A and 32B of the embodiment under consideration will be described.

(a) Optimization of Separation Distance

First, let's focus on the separation distance between the auxiliary teeth that reduces cogging thrust. The applicants of the aspect of the present invention conducted studies based on the description of JP, B, 4103066, and found that the separation distance between the auxiliary teeth for reducing the primary component and secondary component of the cogging thrust is expressed by the following equations.

Separation distance Dt between auxiliary teeth for reducing primary component of cogging thrust:

$Dt=(2n-1)Pm/2$ (where $n$ is a natural number) [optimization condition a-1]

Separation distance Dt between auxiliary teeth for reducing secondary component of cogging thrust:

$Dt=(2n-1)Pm/4$ (where $n$ is a natural number) [optimization condition a-2]

Note that, in a precise sense, these equations may have a slight margin of error as a result of the width of the auxiliary teeth and the effects of magnetic saturation of the armature core.

(b) Optimization of Teeth Height

Next, let's focus on the height of the auxiliary teeth that reduces the cogging thrust. The applicants of the aspect of the present invention conducted a magnetic field analysis study on reducing the primary component and secondary component of the cogging thrust, using the same structure as that illustrated in FIG. 1. That is, based on the results of (a) above, the applicants established a fixed separation distance Dt for the primary component based on the above optimization condition a-1, and repeatedly calculated the cogging thrust while changing the height Ht of the auxiliary teeth (within the range of 70 mm to 74 mm in this example). Similarly, the applicants established a fixed separation distance Dt for the secondary component based on the above optimization condition a-2, and repeatedly calculated the cogging thrust while changing the height Ht of the auxiliary teeth. Then, the investigation results shown in FIG. 2 were obtained.

Figure 2:
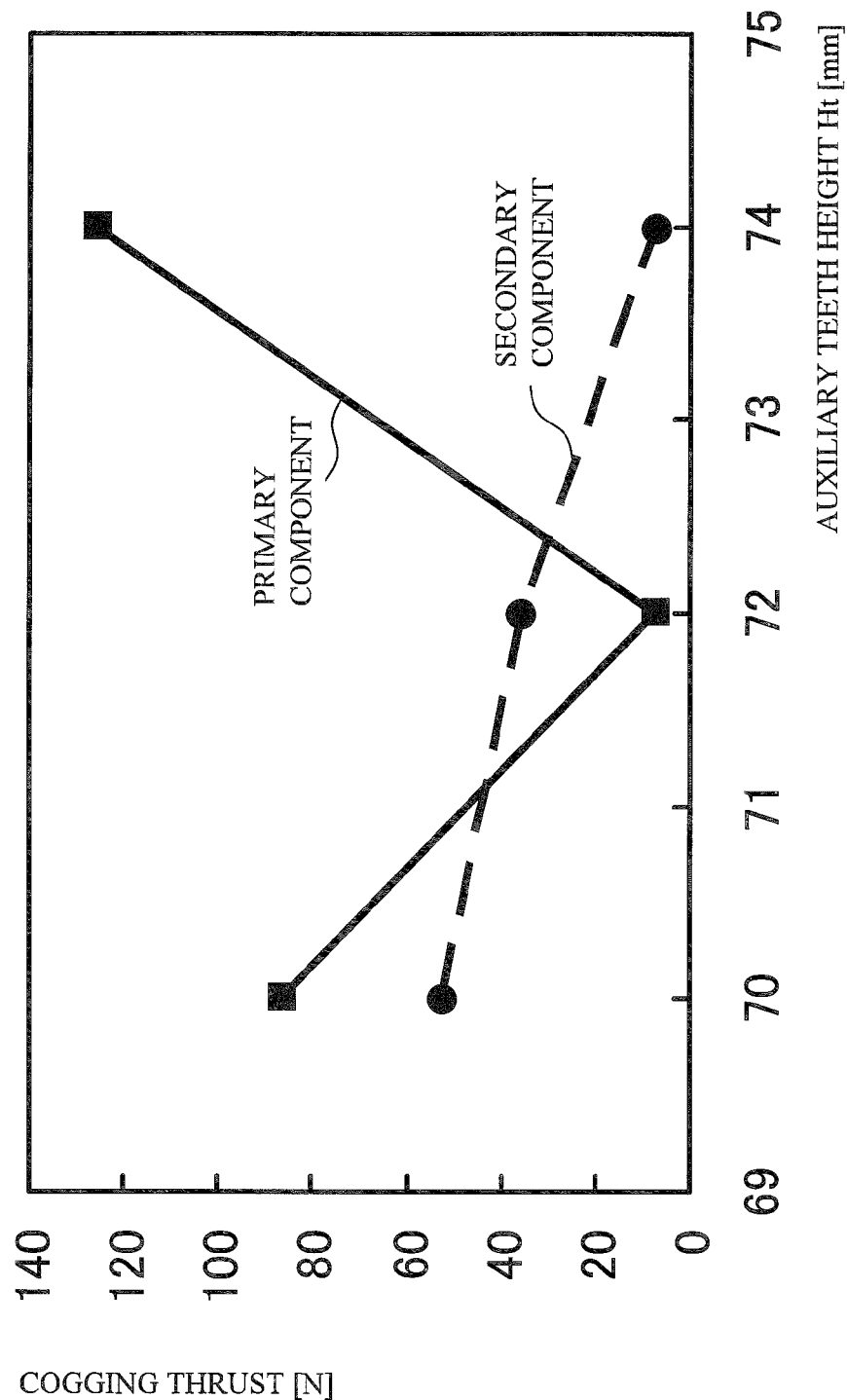
FIG. 2 is a graph showing the results of magnetic field analysis for reducing the primary component and secondary component of cogging thrust.

As shown in FIG. 2, under conditions that optimize the separation distance between the auxiliary teeth as described above, the height of the auxiliary teeth that minimizes the primary component of the cogging thrust (=optimization condition b-1) is the following:

$$Ht=72 \text{ mm}$$

In this example, the minimum value of the primary component at this height is less than 10 [N].

In contrast, under conditions that optimize the separation distance between the auxiliary teeth as described above, the height of the auxiliary teeth that minimizes the secondary component of the cogging thrust (=optimization condition b-2) is the following:

$$Ht=74 \text{ mm}$$

In this example, the minimum value of the secondary component at this height is less than 10 [N].

That is, depending on whether the component of the cogging thrust that is to be preferably reduced is the primary component or secondary component, the value of the optimum height Ht of the auxiliary teeth for reducing the component differs.

(c) Optimization of Shape

As understood from the results of the above (a) and (b), the optimum auxiliary teeth for reducing the primary component of the cogging thrust are auxiliary teeth imparted with a separation distance Dt that satisfies the optimization condition a-1, and a height Ht that satisfies the optimization condition b-1. On the other hand, the optimum auxiliary teeth for reducing the secondary component of the cogging thrust are auxiliary teeth imparted with a separation distance Dt that satisfies the optimization condition a-2, and a height Ht that satisfies the optimization condition b-2. Then, as is clear from the above, the value of the separation distance of optimization condition a-1 and the value of the separation distance of optimization condition a-2 differ from each other, and the value of the teeth height of optimization condition b-1 and the value of the teeth height of optimization condition b-2 differ from each other.

According to the embodiment under consideration, the auxiliary teeth 32A and 32B are designed to have the aforementioned stepped shape, making a separation distance Dt1 between the first steps 32A1 and 32B1, and a separation distance Dt2 between the second steps 32A2 and 32B2 different from each other. With this arrangement, Dt1 is set to a value that satisfies the optimization condition a-1 and Dt2 is set to a value that satisfies the optimization condition a-2, making it possible to achieve the optimum separation distance for reducing the primary component and secondary component of the cogging thrust with the auxiliary teeth 32A and 32B. Similarly, the auxiliary teeth 32A and 32B are designed to have the aforementioned stepped shape, making the height Ht1 between the first steps 32A1 and 32B1, and the height Ht2 between the second steps 32A2 and 32B2 different from each other. With this arrangement, Ht1 is set to a value that satisfies the optimization condition b-1 and Ht2 is set to a value that satisfies the optimization condition b-2, making it possible to achieve the optimum teeth height for reducing the primary component and secondary component of the cogging thrust.

Note that, in the above, the first step 32A1 of the auxiliary tooth 32A and the first step 32B1 of the auxiliary tooth 32B make up the primary component reducing portion described in the claims that is capable of reducing the primary component of the cogging thrust. Further, the second step 32A2 of the auxiliary tooth 32A and the second step 32B2 of the auxiliary tooth 32B make up the secondary component reducing portion that is capable of reducing the secondary component of the cogging thrust. Then, these together make up the plurality of cogging thrust reducing portions.

As described above, according to the linear motor 1 of the embodiment, the first steps 32A1 and 32B1 of the auxiliary teeth 32A and 32B achieve the optimum separation distance and teeth height for reducing the primary component included in the cogging thrust, and the second steps 32A2 and 32B2 achieve the optimum separation distance and teeth height for reducing the secondary component included in the cogging thrust. With this arrangement, the primary component and the secondary component included in the cogging thrust can be simultaneously and reliably reduced. As a result, it is possible to achieve highly accurate drive control and positioning control. Further, since it is thus possible to simultaneously decrease the plurality of components of the cogging thrust, the aspect of the present invention also has the effect of increasing the degree of freedom of design in terms of cogging thrust minimization.

Figure 3:
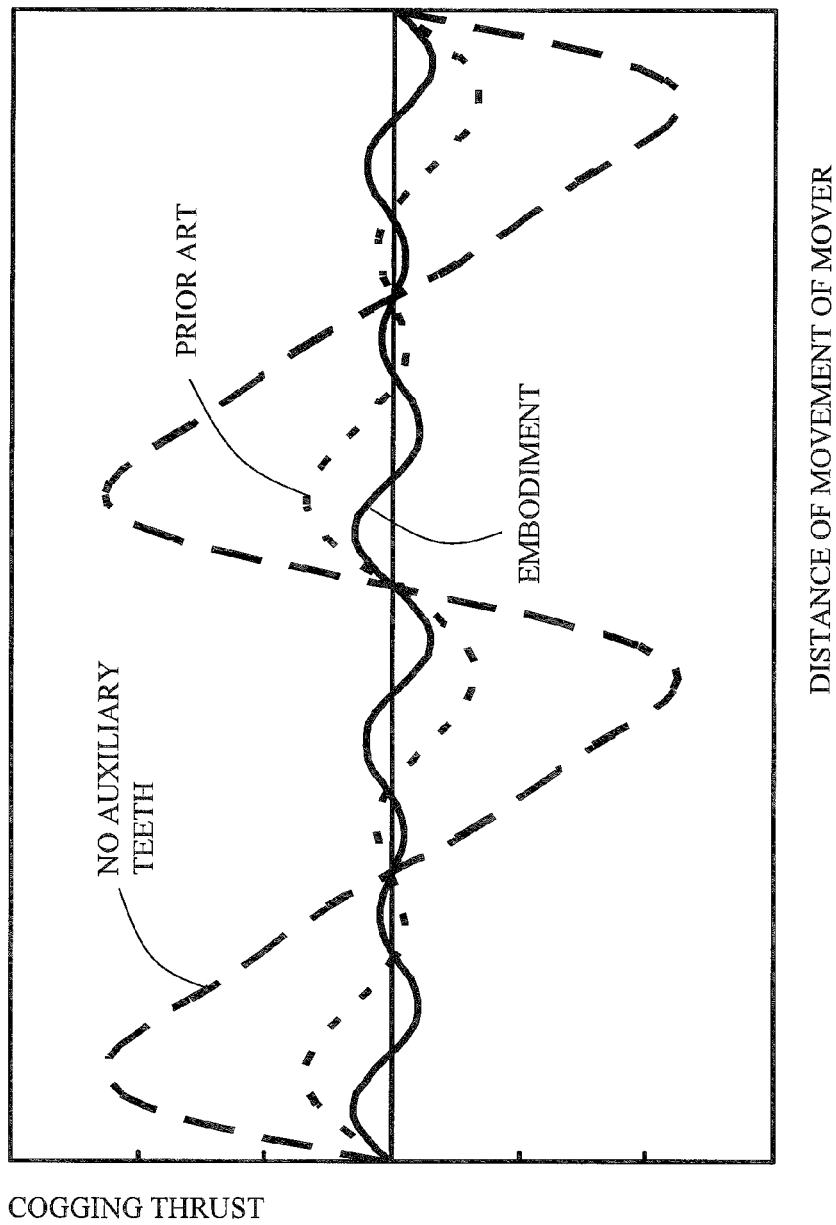
FIG. 3 is a graph showing the cogging thrust reduction effect of the linear motor 1 shown in FIG. 1.

FIG. 3 is a graph showing the cogging thrust reducing effect of the linear motor 1 of such an embodiment compared to a structure that is not provided with any auxiliary teeth and a structure that is provided with auxiliary teeth having an end shape equivalent to that in the above-described prior art. The horizontal axis shows the distance of movement of the mover, and the vertical axis shows the waveform (including all components) of the cogging thrust when the size of the cogging thrust was captured. As understood from this figure, in this embodiment, both the primary component and the secondary component of the cogging thrust can be reliably reduced by the principle described above.

Note that the aspect of the present invention is not limited to the above-described embodiment, and various modifications may be made without deviating from the spirit and scope of the aspect of the invention. The following describes such modifications one by one.

(1) When Extended to Tertiary and Subsequent Components

While the above has described an illustrative scenario in which the main focus was placed on reducing a primary component and secondary component serving as the main components of the cogging thrust, the same concept can be used for further reducing tertiary and subsequent components as well.

That is, by further expanding the investigation results of (a) above, the applicants of the aspect of the present invention found that the condition related to the above separation distance Dt between the auxiliary teeth for reducing the k-order component (where k is an integer greater than or equal to 3) of the cogging thrust can be expressed as follows:

$$Dt=(2n-1)Pm/(2\times k)$$

where n is a natural number and k is an order of cogging thrust.

Thus, similar to the above embodiment, the separation distance can be expressed as follows:

Separation distance Dt between auxiliary teeth for reducing tertiary component of cogging thrust (when k=3):

$$Dt=(2n-1)Pm/6 \text{ (where } n \text{ is a natural number)} \quad \text{[optimization condition a-3]}$$

Separation distance Dt between auxiliary teeth for reducing quaternary component of cogging thrust (when k=4):

$$Dt=(2n-1)Pm/8 \text{ (where } n \text{ is a natural number)} \quad \text{[optimization condition a-4]}$$

( . . . hereafter the same . . . )

Although detailed views are omitted, the applicants of the aspect of the present invention further expanded the investigation results of the above (b) and found that, similar to the above, the above-described teeth height Ht of the auxiliary teeth exists individually for the height of the auxiliary teeth that minimizes the tertiary component of the cogging thrust (=minimization condition b-3), the height of the auxiliary teeth that minimizes the quaternary component of the cogging thrust (=minimization condition b-4), etc.

Figure 4:
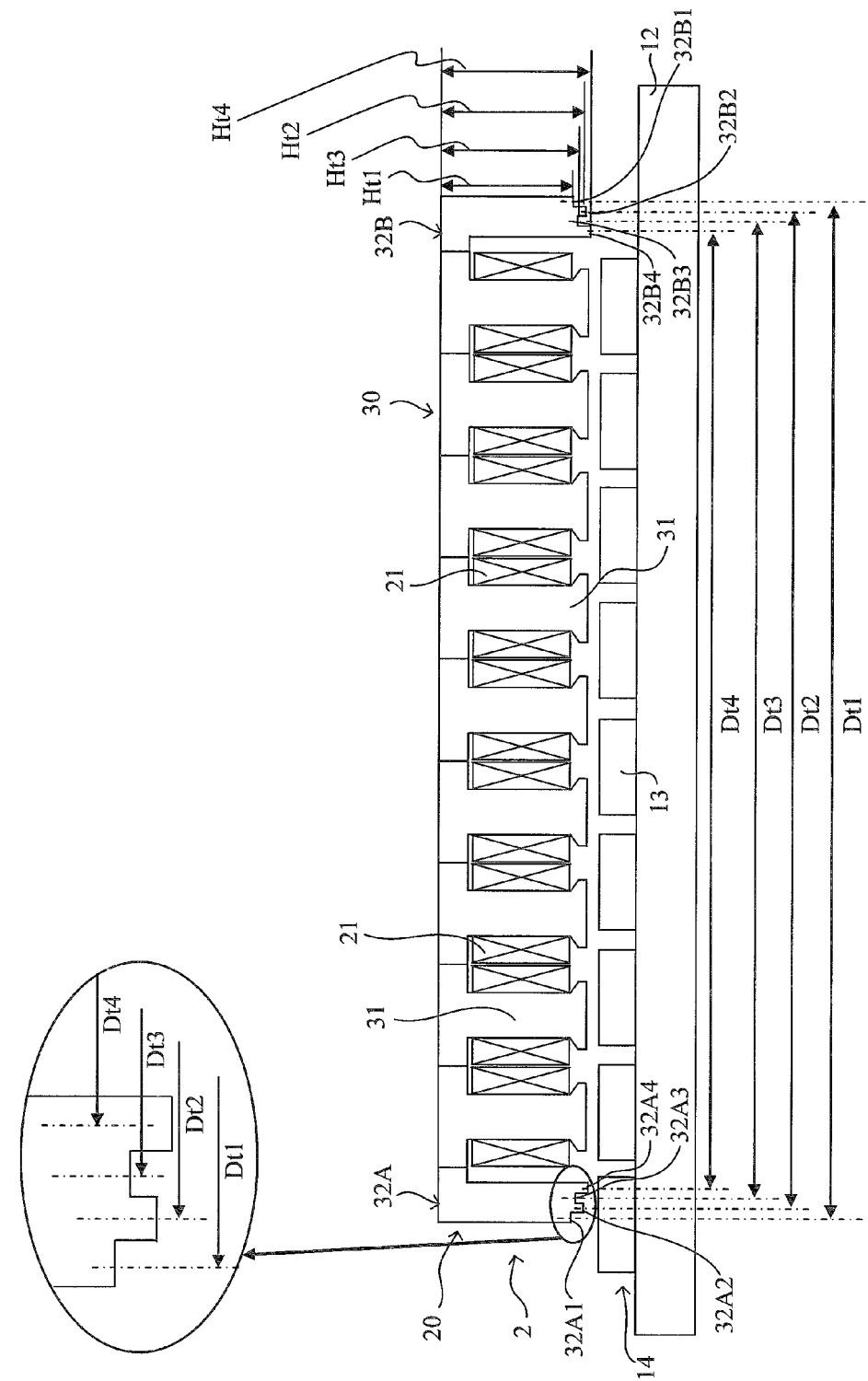
FIG. 4 is a longitudinal sectional view illustrating the structure of a linear motor of an exemplary modification expanded to decrease a tertiary component of the cogging thrust.

FIG. 4 is a longitudinal sectional view illustrating the structure of a linear motor of this exemplary modification based on the above findings, and corresponds to the above-described FIG. 1. That is, the auxiliary tooth 32A comprises the first step 32A1, the second step 32A2, a third step 32A3, and a fourth step 32A4. Similarly, the auxiliary tooth 32B comprises the first step 32B1, the second step 32B2, a third step 32B3, and a fourth step 32B4.

The height of the first steps 32A1 and 32B1 of the auxiliary teeth 32A and 32B, respectively, is Ht1, the height of the second steps 32A2 and 32B2 is Ht2, the height of the third steps 32A3 and 32B3 is Ht3, and the height of the fourth steps 32A4 and 32B4 is Ht4. The size relationship of these heights Ht1 to Ht4 in the example shown in the figure is Ht1<Ht3<Ht2<Ht4.

The separation distance between the first step 32A1 of the auxiliary tooth 32A and the first step 32B1 of the auxiliary tooth 32B is Dt1, the separation distance between the second step 32A2 of the auxiliary tooth 32A and the second step 32B2 of the auxiliary tooth 32B is Dt2 (which is smaller than the above Dt1), the separation distance between the third step 32A3 of the auxiliary tooth 32A and the third step 32B3 of the auxiliary tooth 32B is Dt3 (which is smaller than the above Dt2), and the separation distance between the fourth step 32A4 of the auxiliary tooth 32A and the fourth step 32B4 of the auxiliary tooth 32B is Dt4 (which is smaller than the above Dt3).

With such a stepped structure, the auxiliary teeth 32A and 32B exhibit an end portion shape in which the height changes from Ht1→Ht2→Ht3→Ht4 along the direction of travel. Namely, in the modification, the shape varying means recited in the claims consist of the stepped structure.

Note that, in the above, the first step 32A1, the second step 32A2, the third step 32A3, and the fourth step 32A4 of the auxiliary tooth 32A, and the first step 32B1, the second step 32B2, the third step 32B3, and the fourth step 32B4 of the auxiliary tooth 32B respectively make up the plurality of the cogging thrust reducing portions.

In the exemplary modification having such a structure, the auxiliary teeth 32A and 32B are designed with the aforementioned stepped shape in accordance with the above, and thus the separation distance Dt1 between the first steps 32A1 and 32B1, the separation distance Dt2 between the second steps 32A2 and 32B2, the separation distance Dt3 between the third steps 32A3 and 32B3, and the separation distance Dt4 between the fourth steps 32A4 and 32B4 differ from each other. As a result, Dt1 is set to a value that satisfies the above optimization condition a-1, Dt2 is set to a value that satisfies the above optimization condition a-2, Dt3 is set to a value that satisfies the above optimization condition a-3, and Dt4 is set to a value that satisfies the above optimization condition a-4, making it possible to achieve the optimum separation distance for respectively reducing the primary to quaternary components of the cogging thrust using only auxiliary teeth 32A and 32B.

Similarly, the auxiliary teeth 32A and 32B are designed with a stepped shape, with the height Ht1 of the first steps 32A1 and 32B1, the height Ht2 of the second steps 32A2 and 32B2, the height Ht3 of the third steps 32A3 and 32B3, and the height Ht4 of the fourth steps 32A4 and 32B4 individually set. With this arrangement, Ht1 is set to a value that satisfies the above optimization condition b-1, Ht2 is set to a value that satisfies the above optimization condition b-2, Ht3 is set to a value that satisfies the above optimization condition b-3, and Ht4 is set to a value that satisfies the above optimization condition b-4, making it possible to achieve the optimum teeth height for respectively reducing the primary to quaternary components of the cogging thrust.

As a result, according to the exemplary modification under consideration, the primary to quaternary components included in the cogging thrust can be simultaneously and reliably reduced in the same manner as the above embodiment. As a result, it is possible to achieve highly accurate drive control and positioning control.

Further, while the above has described an illustrative scenario in which the primary component to quaternary component of the cogging thrust are reduced given k=4, it is possible to simultaneously and reliably reduce all primary to k-order components included in the cogging thrust by providing a first step to k step (where k≧5) on the auxiliary teeth 32A and 32B.

(2) When the End Portion Shape of the Auxiliary Teeth is Curved

While the first steps 32A1 and 32B1 and the second steps 32A2 and 32B2 comprising the heights Ht1 and Ht2 and the separation distances Dt1 and Dt2 are provided in the above embodiment, and the first steps 32A1 and 32B1 to the fourth steps 32A4 to 32B4 comprising the heights Ht1 to Ht4 and the separation distances Dt1 to Dt4 are provided in the above exemplary modification (1), thereby achieving an end portion shape that changes in height along the direction of travel, the aspect of the present invention is not limited thereto. That is, an end portion shape that changes in height along the direction of travel may also be achieved by making the end portion of the auxiliary teeth curved rather than stepped in shape.

Figure 5:
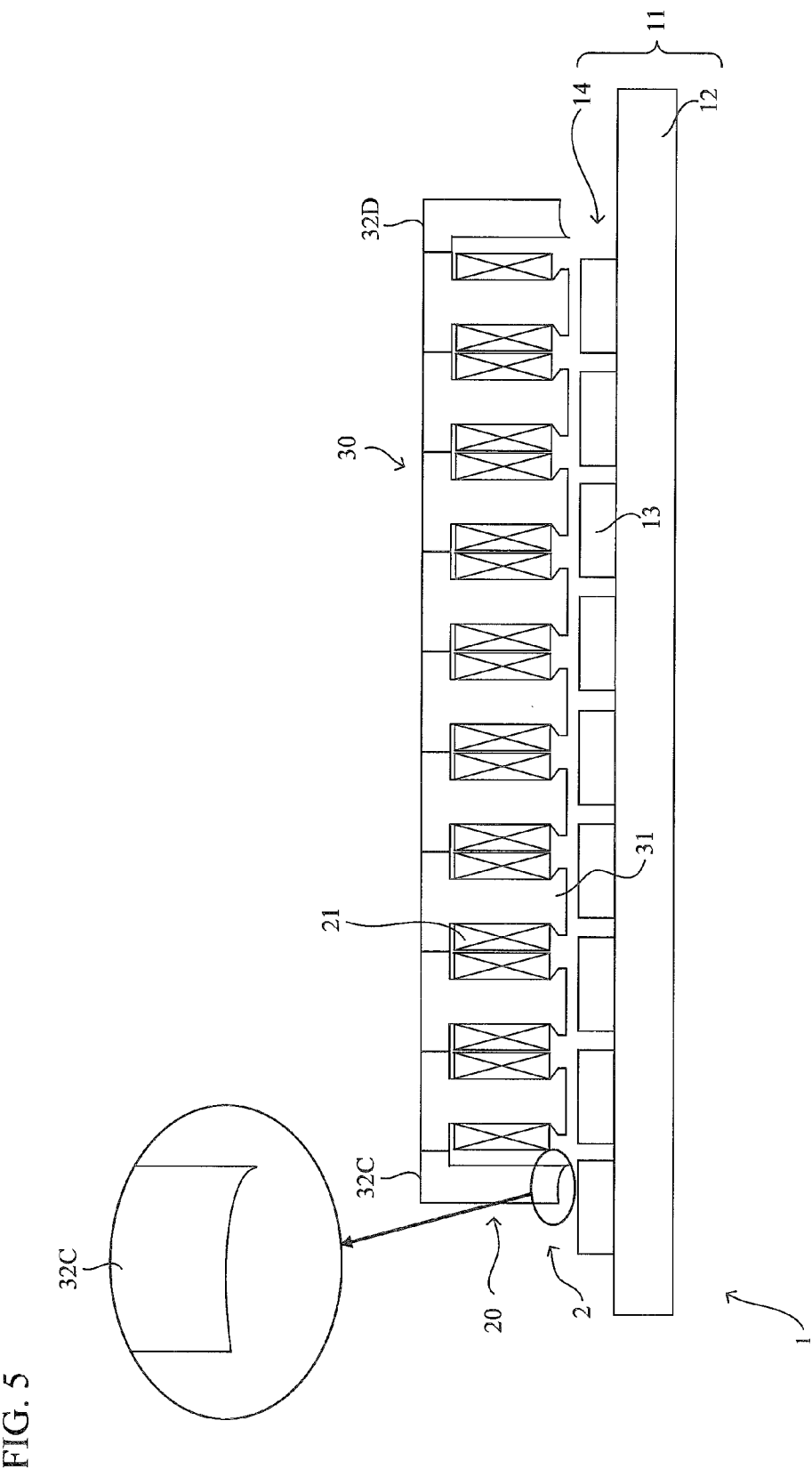
FIG. 5 is a longitudinal sectional view illustrating the structure of a linear motor according to an exemplary modification in which the end portions of the auxiliary teeth are curved in shape.

FIG. 5 is an exemplary modification corresponding to a structure of the above-described embodiment shown in FIG. 1, provided with auxiliary teeth 32C and 32D in place of auxiliary teeth 32A and 32B of FIG. 1. The auxiliary teeth 32C and 32D are imparted with the height Ht1 and separation distance Dt1 in the area equivalent to the first steps 32A1 and 32B1 as well as the height Ht2 and separation distance Dt2 in the area equivalent to the second steps 32A2 and 32B2 of the auxiliary teeth 32A and 32B shown in FIG. 1, and are designed so that the region between these two areas as well as all other areas are smoothly connected by curves. Namely, in the modification, the shape varying means recited in the claims consist of the connection structure by using the curves.

Figure 6:
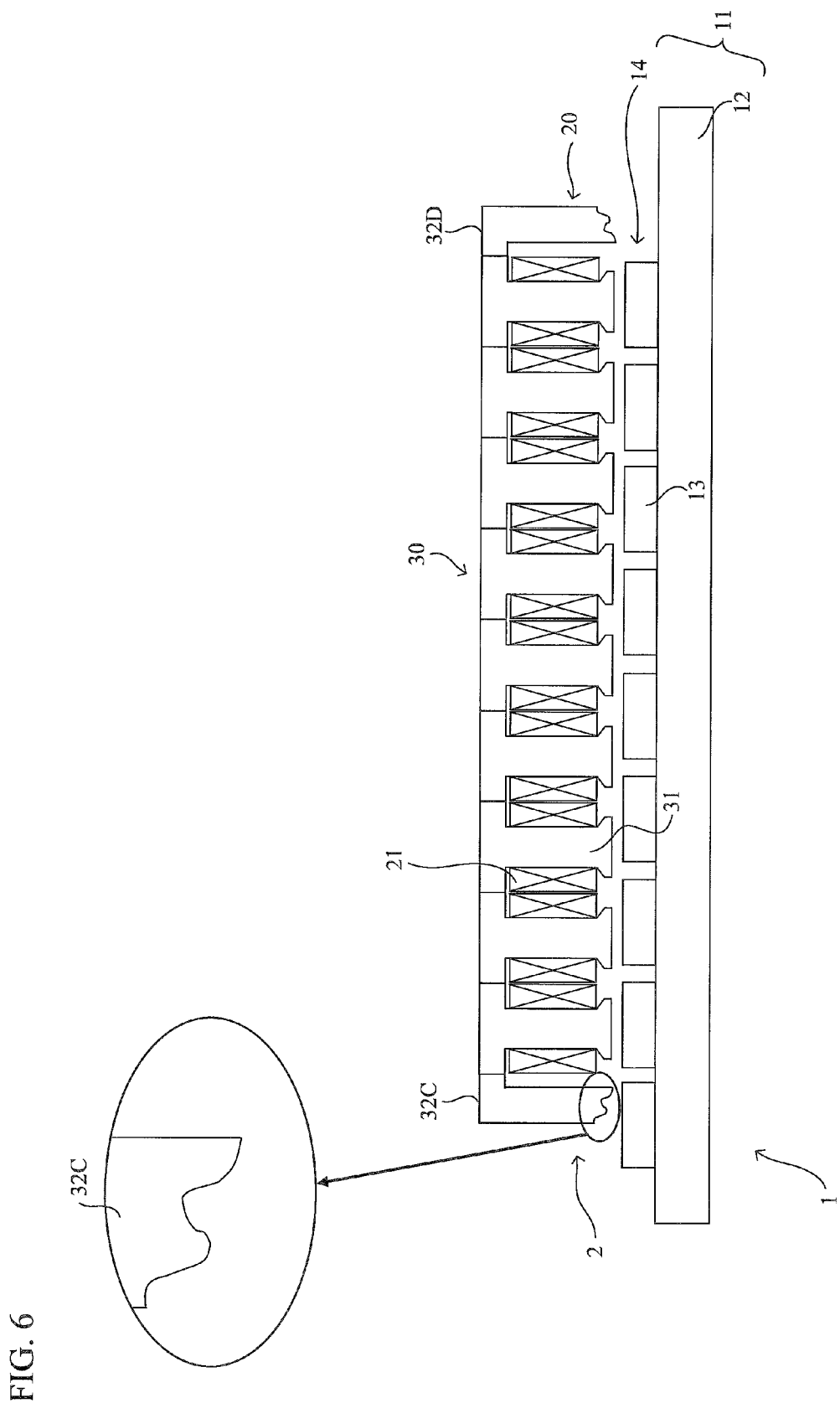
FIG. 6 is a longitudinal sectional view illustrating the structure of a linear motor according to another exemplary modification in which the end portions of the auxiliary teeth are curved in shape.

In addition, FIG. 6 is an exemplary modification corresponding to a structure of the exemplary modification of the above (1) shown in FIG. 4, provided with the auxiliary teeth 32C and 32D in place of auxiliary teeth 32A and 32B of FIG. 4. The auxiliary teeth 32C and 32D are imparted with the height Ht1 and the separation distance Dt1 in the area equivalent to the first steps 32A1 and 32B1, the height Ht2 and the separation distance Dt2 in the area equivalent to the second steps 32A2 and 32B2, the height Ht3 and the separation distance Dt3 in the area equivalent to the third steps 32A3 and 32B3, and the height Ht4 and the separation distance Dt4 in the area equivalent to the fourth steps 32A4 and 32B4 of the auxiliary teeth 32A and 32B shown in FIG. 4, and are designed so that the regions between these four areas as well as all other areas are smoothly connected by curves.

According to the exemplary modifications of FIG. 5 and FIG. 6 as well, the same advantages can be achieved as in the above-described embodiment and exemplary modification (1), respectively. In addition, the change in flux can be alleviated and made smooth by the curved connected shape, thereby achieving the effect of reliably decreasing the cogging thrust even further as well.

(3) When the Aspect of the Present Invention is Applied to a Through-Flux Type Linear Motor While the above has described an illustrative scenario in which the aspect of the present invention is applied to a so-called gap-opposed type linear motor in which the field yoke exists only on one side of the armature, the aspect of the present invention is not limited thereto. That is, the aspect of the present invention may also be applied to a so-called through-flux type linear motor in which the field yoke exists on both sides of the armature.

Figure 7:
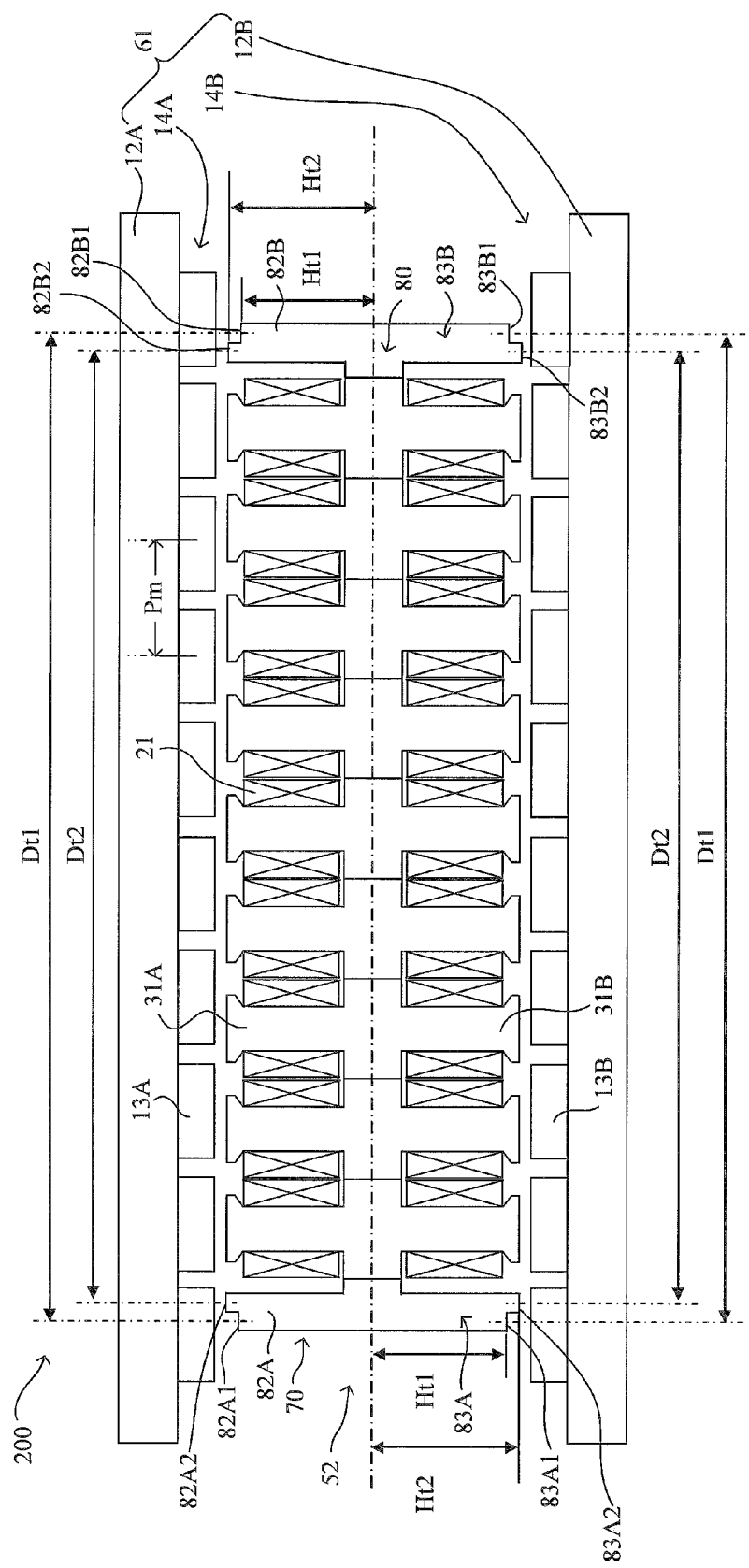
FIG. 7 is a longitudinal sectional view illustrating the structure of a linear motor according to an exemplary modification in which the aspect of the present invention is applied to a through-flux type linear motor.

FIG. 7 is a longitudinal sectional view illustrating the structure of a linear motor according to the exemplary modification under consideration, and corresponds to the above-described FIG. 1.

In FIG. 7, a linear motor 200 of the exemplary modification under consideration comprises a stator 61 and a mover 52.

The stator 61 comprises a field system made of a plurality (two in this example) of field yokes 12A and 12B and a magnet series 14A and 14B respectively provided to the field yokes 12A and 12B and comprising a plurality of permanent magnets 13A and 13B. The magnet series 14A and 14B is linearly disposed on the inside of the field yokes 12A and 12B along a direction of travel (left-right direction in FIG. 7) of the mover 52 so that the plurality of permanent magnets 13A and 13B alternate in polarity. The permanent magnets 13A and 13B are disposed so that adjacent magnets are arranged at a predetermined pitch Pm and the polarities of the opposing permanent magnet 13A and the permanent magnet 13B on either side of the mover 52 differ.

The mover 52 comprises an armature 70 disposed facing the field system with a magnetic air gap therebetween. The armature 70 comprises an armature core 80 provided with the armature windings 21. The armature core 80 comprises nine main teeth 31A facing the magnet series 14A, nine main teeth 31B facing the magnet series 14B, two auxiliary teeth 82A and 82B respectively provided on both sides of the nine main teeth 31A and around which the armature windings 21 is not wound, and two auxiliary teeth 83A and 83B respectively provided on both sides of the nine main teeth 31B and around which the armature windings 21 is not wound.

The auxiliary teeth 82A, 82B, 83A, 83B have a stepped end portion shape, similar to the auxiliary teeth 32A and 32B of the above-described embodiment. That is, the auxiliary teeth 82A and 82B comprise first steps 82A1 and 82B1 of the height Ht1, and second steps 82A2 and 82B2 of the height Ht2 which is greater than Ht1. The separation distance between the first step 82A1 of the auxiliary tooth 82A and the first step 82B1 of the auxiliary tooth 82B is Dt1, and the separation distance between the second step 82A2 of the auxiliary tooth 82A and the second step 82B2 of the auxiliary tooth 82B is Dt2 (which is smaller than the above Dt1). Similarly, the auxiliary teeth 83A and 83B comprise first steps 83A1 and 83B1 of the height Ht1 and second steps 83A2 and 83B2 of the height Ht2, the separation distance between the first step 83A1 and the first step 83B1 is Dt1, and the separation distance between the second step 83A2 and the second step 83B2 is Dt2. With such a stepped structure, the auxiliary teeth 82A, 82B, 83A, and 83B exhibit an end portion shape in which the height changes from Ht1 to Ht2 along the direction of travel. Namely, in the modification, the shape varying means recited in the claims consist of the stepped structure.

Note that, in the above, the first steps 82A1, 82B1, 83A1, and 83B1 of the auxiliary teeth 82A, 82B, 83A, and 83B make up the primary component reducing portion described in the claims, and the second steps 82A2, 82B2, 83A2, and 83B2 make up the secondary component reducing portion. Then, these together make up the plurality of cogging thrust reducing portions.

With the above configuration, the linear motor 200 introduces a predetermined current corresponding to the position of the armature 70 to the armature windings 21, resulting in an electromagnetic effect between the armature windings 21 and the permanent magnets 13A and 13B that causes the mover 52 to move linearly along the direction of travel. At this time, magnetic imbalance occurs on both ends of the armature core 80, producing a cogging thrust. At this time, similar to the above-described embodiment, in the exemplary modification under consideration, the first steps 82A1, 82B1, 83A1, and 83B1 of the auxiliary teeth 82A, 82B, 83A, and 83B achieve an optimum separation distance and teeth height for reducing the primary component included in the cogging thrust, and the second steps 82A2, 82B2, 83A2, and 83B2 achieve an optimum separation distance and teeth height for reducing the secondary component included in the cogging thrust, thereby making it possible to simultaneously and reliably reduce the primary component and secondary component included in the cogging thrust. That is, even in a case where the aspect of the present invention is applied to a through-flux type linear motor, it is possible to achieve the same advantages as in a case of application to a gap-opposed type linear motor.

While the above has described an illustrative scenario in which the field system including the field yokes 12, 12A, and 12B wherein the magnet series 14, 14A, and 14B are provided is the stator and the armatures 20 and 70 are the movers, the aspect of the present invention is not limited thereto. Conversely, a structure in which the armatures 20 and 70 are the stators and the field system is the mover is also acceptable. In this case as well, advantages similar to those described above can be achieved.

Further, in addition to the examples described above, the techniques of the above-described embodiment and exemplary modifications may be suitably combined as well.

Although other examples are not individually described herein, various changes and modifications can be made without departing from the spirit and scope of the aspect of the invention.

According to the linear motor of the aspect of the present invention, it is possible to achieve highly accurate drive control and positioning control. As a result, a preferred linear motor for industrial machine tools, semiconductor packaging equipment, and the like that particularly require low cogging thrust can be achieved.

What is claimed is:

1. A linear motor comprising:
   a field system in which a plurality of permanent magnets are linearly arranged on a field yoke so that the polarities thereof are alternated; and
   an armature configured to face said field system with a magnetic air gap therebetween and to have an armature core provided with armature windings,
   said linear motor running along a predetermined direction of travel with either said field system or said armature serving as a mover and the other serving as a stator, wherein:
   said armature core comprises:
      auxiliary teeth that are respectively provided on both ends along said direction of travel and around which said armature windings are not wound; and
      a plurality of main teeth that are provided between said auxiliary teeth of said both ends and around which said armature windings are respectively wound, and each of said auxiliary teeth comprises a lower surface having an end portion shape in which a dimension in a teeth height direction orthogonal to said direction of travel is variable along said direction of travel, wherein the lower surface faces the magnetic air gap, and wherein the end portion shape of the lower surface is stepped shape, or a curved shape including a concave portion.

2. The linear motor according to claim 1, wherein:
said auxiliary teeth comprise a plurality of cogging thrust reducing portions having a primary component reducing portion and a secondary component reducing portion for respectively reducing a primary component and a secondary component of a cogging thrust during said travel, and
said secondary component reducing portion of said auxiliary teeth of said both ends has a center-to-center separation distance along said direction of travel and a dimension in said teeth height direction that differ from those of said primary component reducing portion of said auxiliary teeth of said both ends.

3. A linear motor comprising:
a field system in which a plurality of permanent magnets are linearly arranged on a field yoke so that the polarities thereof are alternated; and
an armature configured to face said field system with a magnetic air gap therebetween and to have an armature core provided with armature windings,
said linear motor running along a predetermined direction of travel with either said field system or said armature serving as a mover and the other serving as a stator, wherein:
said armature core comprises:
  auxiliary teeth that are respectively provided on both ends along said direction of travel and around which said armature windings are not wound; and
  a plurality of main teeth that are provided between said auxiliary teeth of said both ends and around which said armature windings are respectively wound,
each of said auxiliary teeth comprises an end portion shape in which a dimension in a teeth height direction orthogonal to said direction of travel is variable along said direction of travel,
said auxiliary teeth comprise:
  a stepped end portion shape; and
  a plurality of cogging thrust reducing portions having a primary component reducing portion and a secondary component reducing portion for respectively reducing a primary component and a secondary component of a cogging thrust during said travel,
said secondary component reducing portion of said auxiliary teeth of said both ends has a center-to-center separation distance along said direction of travel and a dimension in said teeth height direction that differ from those of said primary component reducing portion of said auxiliary teeth of said both ends,
said plurality of cogging thrust reducing portions includes primary component reducing portion to k-order component reducing portion provided for respectively reducing primary component to k-order component of said cogging thrust, where k is an integer greater than or equal to 3, and
said primary component reducing portion to k-order component reducing portion of said auxiliary teeth of said both ends each have a center-to-center separation distance along said direction of travel and a dimension in said teeth height direction that differ from one another.

4. A linear motor comprising:
a field system in which a plurality of permanent magnets are linearly arranged on a field yoke so that the polarities thereof are alternated; and
an armature configured to face said field system with a magnetic air gap therebetween and to have an armature core provided with armature windings,
said linear motor running along a predetermined direction of travel with either said field system or said armature serving as a mover and the other serving as a stator, wherein:
said armature core comprises:
  auxiliary teeth that are respectively provided on both ends along said direction of travel and around which said armature windings are not wound; and
  a plurality of main teeth that are provided between said auxiliary teeth of said both ends and around which said armature windings are respectively wound,
each of said auxiliary teeth comprises an end portion shape in which a dimension in a teeth height direction orthogonal to said direction of travel is variable along said direction of travel,
said auxiliary teeth comprise k-order primary component reducing portion for reducing k-order component of a cogging thrust during said travel, where k is an integer greater than or equal to 1, and
a center-to-center separation distance Dtk of said k-order component reducing portion of said auxiliary teeth of said both ends along said direction of travel is:
$Dtk = (2 \times n - 1) \times Pm/(2 \times k)$, where Pm is a pitch for disposing said permanent magnets and n is a natural number.

5. A linear motor comprising:
a field system in which a plurality of permanent magnets are linearly arranged on a field yoke so that the polarities thereof are alternated; and
an armature configured to face said field system with a magnetic air gap therebetween and to have an armature core provided with armature windings,
said linear motor running along a predetermined direction of travel with either said field system or said armature serving as a mover and the other serving as a stator, wherein:
said armature core comprises:
  auxiliary teeth that are respectively provided on both ends along said direction of travel and around which said armature windings are not wound; and
  a plurality of main teeth that are provided between said auxiliary teeth of said both ends and around which said armature windings are respectively wound, and
each of said auxiliary teeth comprises an end portion shape having both an increasing part in which a dimension in a teeth height direction orthogonal to said direction of travel increases along said direction of travel and a decreasing part in which the dimension in the teeth height direction decreases along said direction of travel.

* * * * *